Figure 4:
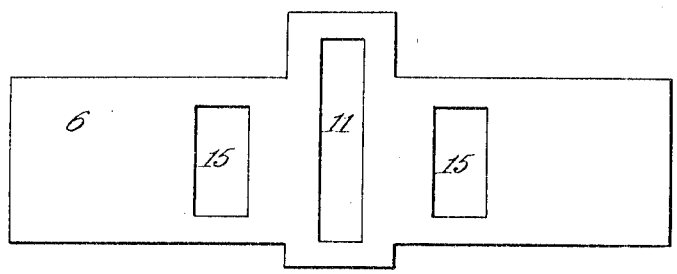

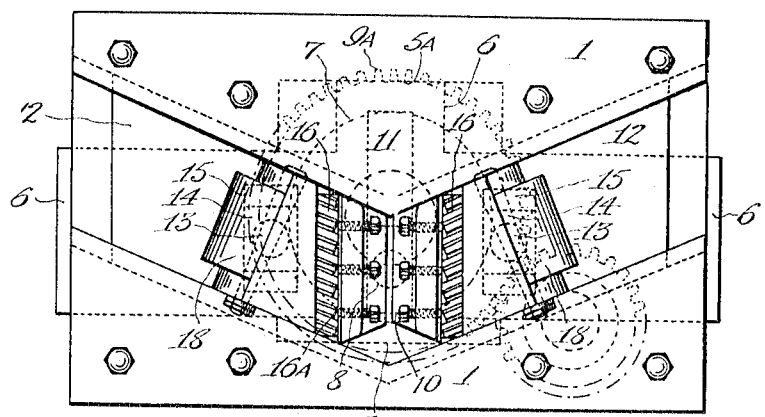

UNITED STATES PATENT OFFICE.

SAM SUNDERLAND, OF HIGH UTLEY, KEIGHLEY, ENGLAND.

GEAR-CUTTING TOOL.

1,090,350. Specification of Letters Patent. Patented Mar. 17, 1914.

Application filed December 31, 1912. Serial No. 739,520.

*To all whom it may concern:*

Be it known that I, SAM SUNDERLAND, a subject of the King of Great Britain and Ireland, and resident of High Utley, Keighley, in the county of York, England, have invented a certain new and useful Improvement Relating to Gear-Cutting Tools, of which the following is a specification.

This invention has for its object, the provision of means whereby hobbing and end milling cutters such as are used for cutting the teeth of double helical wheels may be dispensed with, and in place of such, to construct, mount and operate cutters so that the teeth may be planed and generated to the correct shape for the entire length of each tooth, and obtain continuity of metal at the junction of the angles of the teeth meeting in the central plane of the periphery of wheel.

It is well known among wheel cutting engineers, that the spaces of double helical wheels cannot be cut correctly by hobbing or end milling cutters; in both cases the wheel teeth are defective in the central plane of the periphery of wheel. When hobbing cutters are used, the teeth space cuts from one side of the wheel, extend into the teeth on the opposite side of the wheel, leaving an annular groove through the teeth in the central plane of the periphery of wheel, by which the continuity of metal forming the wheel teeth is destroyed. When the spaces are cut with end milling cutters, the apex on one side of each tooth is left pointed, and requires to be trimmed before the wheels will gear, unless there be an annular groove cut in the central plane of wheel, in which case the continuity of the teeth from one side of the wheel to the other is removed. These defects are removed by the employment of cutters made according to my invention, adapted to plane and generate the teeth of double helical wheels, when mounted and operated in the manner such as hereinafter described.

The drawings illustrate mechanism which may be used for carrying out my invention in connection with a wheel cutting machine, such as described in my patent specification No. 948,830.

In the drawings, like parts are indicated by like references.

Figure 5:
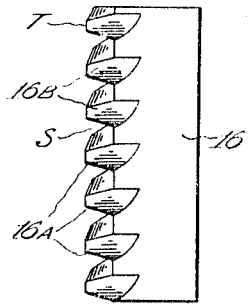
Figure 6:
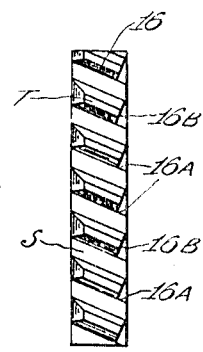
Figure 7:
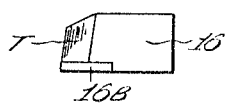

In said drawings, Figure 1 represents a front elevation of mechanism to which my improved cutters are attached. Fig. 2 is a plan of the mechanism attached to a portion of the before mentioned machine. Fig. 3 is an end view shown partly in section. Fig. 4 is a detached detail of the reciprocating plate by which the cutter slides may be operated. Fig. 5 is an elevation of my improved cutter showing the cutting face. Fig. 6, a view showing the angle of the cutting teeth and spaces. Fig. 7 an end view of the cutter, and Fig. 8, a face view of a portion of a double helical wheel.

The front plate 1 is secured by screws to the headstock 2, which is adapted to slide vertically, and operated in a manner such as described in the before named specification. Within the interior of headstock is mounted a spur wheel 9$^A$, rotated by a pinion, and in front of said wheel is a disk 7, from which projects a stud 8, carrying a block 10 engaging with a slot 11 formed in the reciprocated plate 6, carried by suitable guide ways such as 5$^A$, see Fig. 3, that on the rotation of spur wheel 9$^A$ and disk 7, plate 6 is reciprocated.

The wheel blank—not shown by the drawings—may be supported, intermittently rotated and slid in the manner as shown and described in before mentioned specification. The cutter slides 12 are mounted and reciprocated in suitable guide ways formed in the front plate 1, to these slides my improved cutters are attached.

A pin 13 projects from the back of each cutter slide 12, each pin carrying a block 14, engaging with the respective slots 15, shown by dotted lines in Fig. 1, and full lines in Fig. 4, so that as will be obvious, on the reciprocation of plate 6, cutter slides 12 are caused to slide in their respective guide ways.

Figure 8:
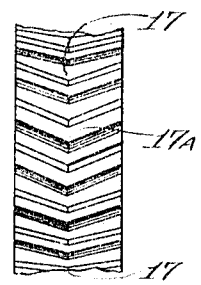

The cutter slides are at the same angle as the teeth of the double helical wheel when cut, such as shown by Fig. 8, and during the reciprocation, one of the cutters 16 is advancing in the direction for cutting, and the other cutter receding from the central plane 17 of wheel periphery, thus making alternate cuts.

The cutters are of the rack type pattern, but of novel construction, the teeth and spaces being angular to the vertical, are secured to ordinary tool boxes 18, connected with the sliding plates 12. The cutters are so adjusted that the lower edge 16$^A$ of each tooth, when sliding in the forward direction, terminates in the center 17 of the periphery of wheel face, leaving the apex or junction of the two angular portions of each tooth of wheel intact, without damaging or destroying the desired continuity of the metal forming the wheel teeth, extending to both sides as shown by Fig. 8.

The angle of the teeth T and spaces S of the cutters are the same as the angle of the cutter slide guide ways in plate 1, and the cutting face at 16$^B$ of each cutter tooth is at or about at right angles to the teeth T and spaces S, and the line of movement of cutters. On the forward movement, the lower edge 16$^A$ of each cutter terminates as before stated at the central plane 17 of the periphery of wheel, the upper edge of the teeth passing the pointed apex 17$^A$ of the wheel teeth without interfering with the correct shape of the teeth at the junction between the two angles of each tooth.

The cross section through each tooth of the cutters, is the same as an ordinary single cutter such as is commonly used by planing and teeth generating machines, so that by forming the cutter teeth and spaces at an angle as shown, the teeth of double helical wheels may be cut by the sliding cutters making alternate cuts from each side of the slowly and intermittently rotating wheel blank, the spaces being cut and the teeth generated by the angular formed cutters in a manner somewhat similar to cutting the teeth of spur wheels by an ordinary cutter such as described in the before named specification.

What I claim as my invention is:—

A cutting tool for cutting the teeth of double helical wheels, comprising a body portion having a plurality of angular teeth formed integral therewith and arranged in a row along one edge thereof, said teeth being suitably spaced apart, and inclined at an angle corresponding to the wheel teeth to be cut, the cutting face of each tooth being formed at right angles to the teeth and the line of movement of the cutters, substantially as described.

In witness whereof I have hereunto set my hand in the presence of two witnesses.

SAM SUNDERLAND.

Witnesses:
A. MAURICE MIDGLEY,
JOHN GILL.